United States Patent
Berning et al.

(10) Patent No.: US 10,562,433 B2
(45) Date of Patent: Feb. 18, 2020

(54) METHOD FOR TRANSPORTING A LARGE MILLING MACHINE SELF-PROPELLED BY GROUND-ENGAGING UNITS

(71) Applicant: Wirtgen GmbH, Windhagen (DE)

(72) Inventors: Christian Berning, Zuelpich (DE); Christopher Mittelstaedt, Neuwied (DE); Hardy Wilhelmi, Dattenberg (DE); Cyrus Barimani, Koenigswinter (DE)

(73) Assignee: Wirtgen GmbH (DE)

( * ) Notice: Subject to any disclaimer, the term of this patent is extended or adjusted under 35 U.S.C. 154(b) by 2 days.

(21) Appl. No.: 15/728,700

(22) Filed: Oct. 10, 2017

(65) Prior Publication Data

US 2018/0126891 A1  May 10, 2018

(30) Foreign Application Priority Data

Oct. 28, 2016 (DE) .......................... 10 2016 221 348

(51) Int. Cl.
| | |
|---|---|
| *B60P 3/06* | (2006.01) |
| *B62D 53/04* | (2006.01) |
| *B02C 21/02* | (2006.01) |

(52) U.S. Cl.
CPC ............ *B60P 3/062* (2013.01); *B02C 21/026* (2013.01); *B60P 3/06* (2013.01); *B62D 53/04* (2013.01)

(58) Field of Classification Search
CPC .......... B02C 21/026; B60P 3/06; B60P 3/062; B60P 3/064

(Continued)

(56) References Cited

U.S. PATENT DOCUMENTS

| | | | | |
|---|---|---|---|---|
| 3,285,449 A | | 11/1966 | Hand | |
| 3,656,780 A | * | 4/1972 | Nordstrom | .............. B60P 3/062 |
| | | | | 280/418.1 |

(Continued)

FOREIGN PATENT DOCUMENTS

| | | |
|---|---|---|
| DE | 102009054293 A1 | 5/2011 |
| EP | 057440 A1 | 6/1993 |

(Continued)

OTHER PUBLICATIONS

European Search Report on corresponding European Patent Application No. EP 17 19 8665, dated Mar. 9, 2018, 3 pages (not prior art).

(Continued)

*Primary Examiner* — James Keenan
(74) *Attorney, Agent, or Firm* — Lucian Wayne Beavers; Patterson Intellectual Property Law, PC (57) ABSTRACT

In a method for transporting a large milling machine self-propelled by ground-engaging units and comprising a machine frame adjustable in height by means of lifting devices using a tractor unit with a fifth-wheel coupling for a semi-trailer couplable behind the tractor unit as seen in the direction of travel,
the following steps are specified:
a.) positioning the machine frame of the large milling machine for coupling the large milling machine to the fifth-wheel coupling of the tractor unit or to a trailer using the ground-engaging units and/or the lifting devices of the large milling machine,
b.) coupling and supporting the machine frame on the fifth-wheel coupling of the tractor unit or on the trailer,
c.) repeating steps a) and b) to establish a mechanical connection between the tractor unit and the trailer by means of coupling the tractor unit and the trailer via the machine frame of the large milling machine, (Continued)

d.) using, as a minimum, the machine frame of the large milling machine with the trailer as semi-trailer.

9 Claims, 9 Drawing Sheets

(58) Field of Classification Search
USPC .......................................................... 414/563
See application file for complete search history.

(56) References Cited

U.S. PATENT DOCUMENTS

| | | | |
|---|---|---|---|
| 5,219,450 A * | 6/1993 | Thurk | ................... E01C 23/065 366/17 |
| 5,460,332 A | 10/1995 | Frick | |
| 6,311,821 B1 | 11/2001 | Douglas | |
| 8,591,155 B2 * | 11/2013 | Lawlor | ................... B60P 3/062 410/45 |
| 9,221,059 B2 * | 12/2015 | Blondin | ................ B02C 21/026 |
| 2001/0020656 A1 | 9/2001 | Frick | |
| 2004/0135344 A1 | 7/2004 | Douglas et al. | |
| 2013/0189032 A1 * | 7/2013 | Bellerose | ............... E01C 23/065 404/75 |
| 2016/0053448 A1 * | 2/2016 | Berning | .................. E01C 23/01 299/1.9 |
| 2016/0107166 A1 * | 4/2016 | Tschantz | ............... B02C 21/026 241/24.31 |
| 2016/0121338 A1 * | 5/2016 | Jonkka | ..................... B02C 1/02 241/30 |
| 2016/0280118 A1 * | 9/2016 | Plas | ........................ B60P 3/062 |

FOREIGN PATENT DOCUMENTS

| | | |
|---|---|---|
| EP | 1068015 A2 | 1/2001 |
| EP | 1121982 A1 | 8/2001 |
| GB | 2489082 A | 9/2012 |
| WO | 99049976 A2 | 10/1999 |
| WO | 2003072423 A1 | 9/2003 |

OTHER PUBLICATIONS

Article re Kleemann Transport System, www.baumagazin.eu, Apr. 2015 (1 page), with English translation.

* cited by examiner

METHOD FOR TRANSPORTING A LARGE MILLING MACHINE SELF-PROPELLED BY GROUND-ENGAGING UNITS

1. FIELD OF THE INVENTION

The invention relates to a method for transporting a large milling machine self-propelled by ground-engaging units, a transport system for a self-propelled large milling machine, the use of a tractor unit for transporting a large milling machine self-propelled by ground-engaging units, as well as a coupling device for coupling a large milling machine to a fifth-wheel coupling connected to the tractor unit.

2. DESCRIPTION OF THE PRIOR ART

Large milling machines are used, for example, in the rehabilitation of an asphalt or concrete road pavement. For this purpose, the large milling machines have to be transported to their operating site. A tractor unit with a low-loader is typically used for this purpose. The large milling machine is driven onto the low-loader and then transported to the operating site. Because of the total weight and the dimensions of the transport arrangement, a special permit issued by an authority is frequently required for the transport of a large milling machine.

SUMMARY OF THE INVENTION

It is therefore the object of the present invention to optimize the transport of large milling machines.

The above mentioned object is achieved by the features of the claims.

The invention advantageously specifies that, in a method for transporting a large milling machine self-propelled by ground-engaging units and comprising a machine frame adjustable in height by means of lifting devices using a tractor unit with a fifth-wheel coupling with a semi-trailer couplable behind the tractor unit as seen in the direction of travel, the following steps are specified:
  a) positioning the machine frame of the large milling machine for coupling the large milling machine to the fifth-wheel coupling of the tractor unit or to a trailer preferably using the ground-engaging units and/or the lifting device of the large milling machine,
  b) coupling and supporting the machine frame on the fifth-wheel coupling of the tractor unit or on the trailer,
  c) repeating steps a) and b) to establish a mechanical connection between the tractor unit and the trailer via the machine frame,
  d) using the machine frame of the large milling machine with the trailer as semi-trailer.

The present invention offers the advantage that transport can be optimized, and in particular the total weight of the transport arrangement comprising the tractor unit, large milling machine and trailer is reduced as the machine frame of the large milling machine also forms a part of the semi-trailer. It can thus be avoided that a special permit is required for the transport of the large milling machine. Moreover, the present invention offers the advantage that the ground-engaging units and lifting devices of the large milling machine can also be used in the different method steps, and the method for transporting can thus be optimized altogether.

A trailer is a transport device which is rollable over the ground on one or preferably on multiple axles. The trailer does preferably not have an own traction drive.

In step a), the large milling machine can initially be positioned relative to the tractor unit preferably using the ground-engaging units and/or the lifting devices of the large milling machine, and then, in step b), the machine frame of the large milling machine can be coupled to the fifth-wheel coupling of the tractor unit. Subsequently, in step c), the large milling machine can be positioned relative to the trailer, and the machine frame of the large milling machine can be coupled to the multiple-axle trailer, and thus a mechanical connection can be established between the tractor unit and the trailer.

Alternatively, in step a), the large milling machine can initially be positioned relative to the trailer preferably using the ground-engaging units and/or the lifting devices of the large milling machine, and then, in step b), the machine frame of the large milling machine can be coupled to the trailer. Subsequently, in step c), the large milling machine can be positioned relative to the tractor unit, and the machine frame of the large milling machine can be coupled to the fifth-wheel coupling of the tractor unit, and thus a mechanical connection can be established between the tractor unit and the trailer.

For connection of the large milling machine with the tractor unit and the trailer, devices may be in place at the machine frame of the large milling machine for coupling the machine frame to the tractor unit and/or the trailer.

Positioning of the large milling machine relative to the trailer and/or to the tractor unit in steps a) and c) can be effected in all embodiments using the ground-engaging units and/or the lifting devices of the large milling machine and/or using the drive of the tractor unit and/or by moving the trailer.

This offers the advantage, in particular, that the large milling machine can be coupled to the tractor unit and the trailer without any additional aids and appliances. Preparing the large milling machine for transport can thus be effected more quickly and without the additional use of additional equipment. The method for transporting is thus optimized.

After coupling the large milling machine to the tractor unit and the trailer, the lifting devices of the large milling machine can be retracted in such a fashion that, as a minimum, the large milling machine is supported by the tractor unit and the trailer, in which arrangement the large milling machine is suspended at a specified ground clearance.

After coupling and supporting the machine frame on the trailer, the machine frame can be positioned further relative to the trailer. After further positioning of the machine frame relative to the trailer, the machine frame can be locked with the trailer, that is, a permanent connection established between the trailer and the machine frame.

In step b) or c), one ground-engaging unit of the large milling machine, as a minimum, can be placed above or on the trailer, respectively, using the driving device of the large milling machine and/or using the driving device of the tractor unit.

A first coupling device may be specified between the fifth-wheel coupling and the front end of the machine frame of the large milling machine as seen in the direction of travel, in which arrangement the machine frame of the large milling machine is used with the first coupling device and the trailer as semi-trailer.

A second coupling device may be specified between the trailer and the rear end of the large milling machine as seen in the direction of travel, in which arrangement the machine frame of the large milling machine is used with the second coupling device and the trailer as semi-trailer.

Devices for connecting the machine frame with the first and/or the second coupling device may therefore be specified at the machine frame of the large milling machine.

The coupling devices may be connected with the machine frame in a first step before the method steps a) to c) are performed. Alternatively, the coupling devices may also be connected with the tractor unit and/or the trailer before the methods steps a) to c) are performed.

The trailer can be steered.

The steering angle of the tractor unit and/or the angle between the machine frame and the tractor unit and/or between the machine frame and the trailer may be detected, and, as a minimum, one of the steering angles and/or angles measured may be used for force control of the steering system of the trailer.

According to the present invention, a transport system may further be specified for a self-propelled large milling machine comprising a tractor unit, wherein a fifth-wheel coupling for a semi-trailer couplable behind the tractor unit as seen in the direction of travel is connected with the tractor unit, wherein the large milling machine comprises a machine frame adjustable in height by means of lifting devices. It is specified that the semi-trailer is formed, as a minimum, by the machine frame of the large milling machine and a multiple-axle trailer, the front end of the machine frame of the large milling machine as seen in the direction of travel is supported on the fifth-wheel coupling with the machine frame itself and/or with the ground-engaging units and/or with a first coupling device attachable at the machine frame, and the rear end of the machine frame as seen in the direction of travel is supported on the trailer, which is coupled to the tractor unit mechanically via the machine frame, with the machine frame itself and/or with the ground-engaging units and/or with a second coupling device attachable at the machine frame.

For the purposes of the present invention, the front end of the machine frame as seen in the direction of travel refers to the direction of travel of the transport system. The rear end of the machine frame as seen in the direction of travel signifies the rear end as seen in the direction of travel of the transport system.

The first coupling device may be specified between the fifth-wheel coupling and the front end of the machine frame of the large milling machine as seen in the direction of travel, in which arrangement the machine frame of the large milling machine, as a minimum, forms a semi-trailer with the first coupling device and the trailer.

The second coupling device may be specified between the rear end of the machine frame of the large milling machine as seen in the direction of travel and the trailer, in which arrangement the machine frame of the large milling machine, as a minimum, forms a semi-trailer with the second coupling device and the trailer.

Provided that both the first and the second coupling device is specified, the machine frame of the large milling machine, as a minimum, forms a semi-trailer with the first and the second coupling device and the trailer.

For force control of the steering system of the trailer, sensors may detect the steering angle of the tractor unit and/or the angle between the tractor unit and the machine frame and/or the angle between the machine frame and the trailer, in which arrangement a steering controller may control the steering angle of the trailer in accordance with, as a minimum, one of the steering angles and/or angles measured.

Furthermore, the present invention may specify the use of a tractor unit comprising a fifth-wheel coupling for a semi-trailer couplable behind the tractor unit as seen in the direction of travel for transporting a large milling machine comprising a machine frame, where the semi-trailer is formed, as a minimum, by the machine frame of the large milling machine with a trailer arranged at the rear end of the large milling machine as seen in the direction of travel for supporting the rear end of the machine frame as seen in the direction of travel.

The present invention may further specify the use of a tractor unit comprising a tow hitch for a dolly comprising a fifth-wheel coupling and couplable behind the tractor unit as seen in the direction of travel for a semi-trailer couplable on the dolly for transporting a large milling machine self-propelled by ground-engaging units and comprising a machine frame adjustable in height by means of lifting devices, where the trailer may be formed by the dolly, the machine frame of the large milling machine and a trailer arranged at the rear end of the large milling machine as seen in the direction of travel for supporting and steering the rear end of the large milling machine.

A dolly is a short trailer comprising one or multiple axles and a fifth-wheel coupling for reception of a semi-trailer.

The present invention may further specify a coupling device for coupling a large milling machine to a fifth-wheel coupling connected with a tractor unit and/or trailer, where the trailer is coupled to the tractor unit mechanically via, as a minimum, the large milling machine and the coupling device.

BRIEF DESCRIPTION OF THE DRAWINGS

Hereinafter, embodiments of the invention are illustrated in more detail with reference to the drawings.

The following is shown schematically.

DETAILED DESCRIPTION

Figure 1:
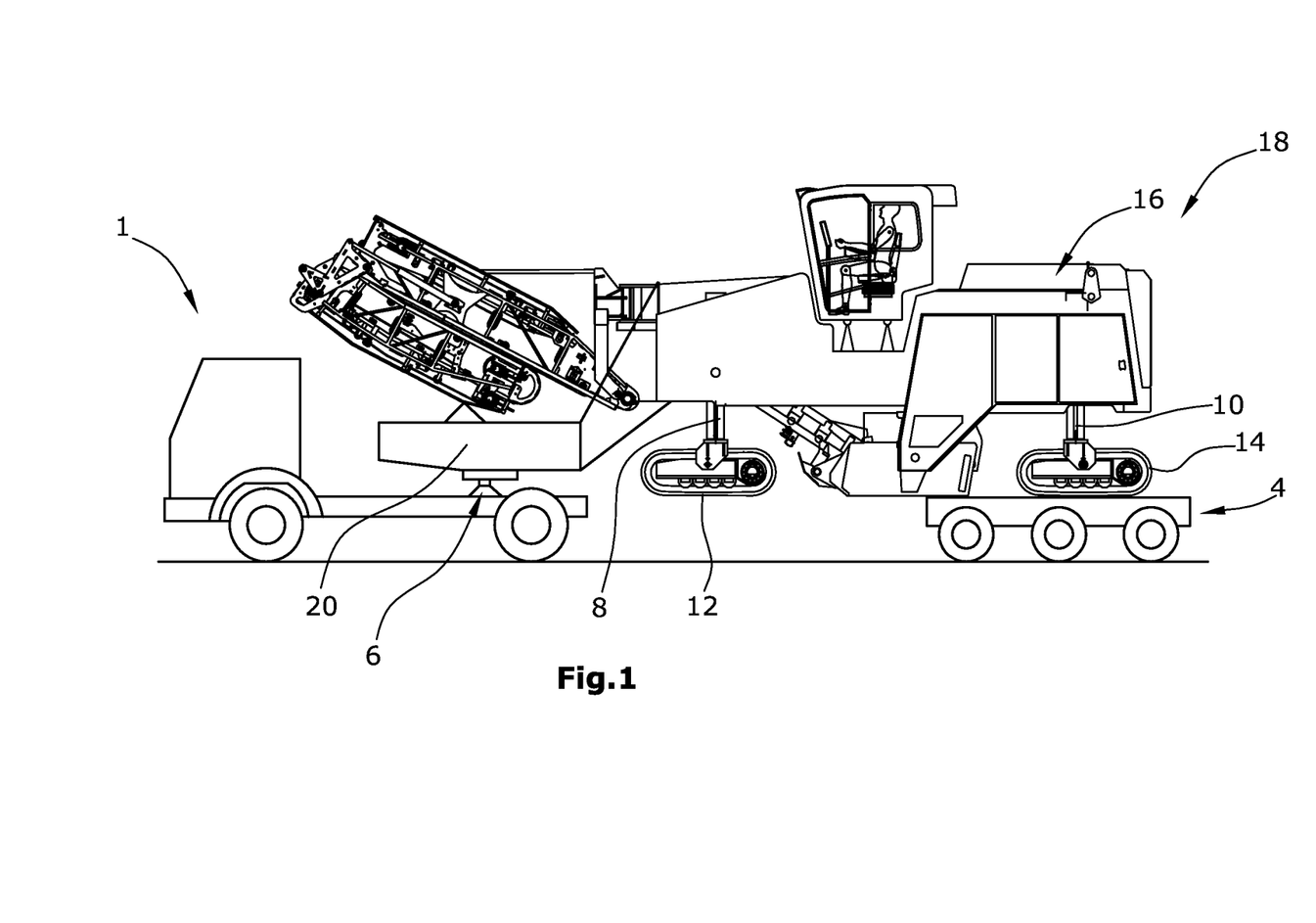
FIG. 1 shows a transport system for a self-propelled large milling machine.

A first embodiment of a transport system for a self-propelled large milling machine is depicted in FIG. 1. The transport system comprises a tractor unit 1, a large milling machine 18 and a trailer 4. The tractor unit 1 is connected with a fifth-wheel coupling 6. The tractor unit 1 preferably comprises the fifth-wheel coupling 6. Alternatively, the tractor unit 1 may also be connected, via a tow hitch, with a dolly couplable behind the tractor unit 1 and in turn comprising a fifth-wheel coupling. The large milling machine 18 comprises a machine frame 16 which is adjustable in height by means of lifting devices 8, 10 and supported by ground-engaging units 12, 14.

The semi-trailer is formed by the machine frame 16 of the large milling machine 18 and the preferably multiple-axle trailer 4. In the embodiment shown, the front end of the machine frame 16 of the large milling machine 18 as seen in the direction of travel of the transport system is supported on the fifth-wheel coupling 6 via a first coupling device 20. The first coupling device 20 is preferably connected with the machine frame 16 of the large milling machine 18. Alternatively, the front end of the machine frame 16 as seen in the direction of travel of the transport system may also be supported on the fifth-wheel coupling 6 directly and/or with, as a minimum, one ground-engaging unit 12, 14.

The rear end of the machine frame 16 as seen in the direction of travel of the transport system is supported, with the ground-engaging units 14, on the trailer 4 coupled to the tractor unit 1 mechanically via the machine frame 16. In this case, the ground-engaging units 14 would have to be fastened at the trailer 4. Alternatively or additionally, the rear end of the machine frame 16 as seen in the direction of travel may be supported directly and/or by means of a second coupling device attachable at the machine frame.

In FIG. 1, the front end of the machine frame 16 of the large milling machine 18 as seen in the direction of travel of the transport system is the front side of the large milling machine 18 itself. The front side of the large milling machine 18 is the front side as seen in the direction of operation of the large milling machine 18, that is, when the large milling machine 18 is self-propelled and is not part of the transport system. Accordingly, the rear side of the large milling machine 18 is the rear side of the large milling machine 18 as seen in the direction of operation, that is, when the same is not part of the transport system but is self-propelled.

Figure 2:
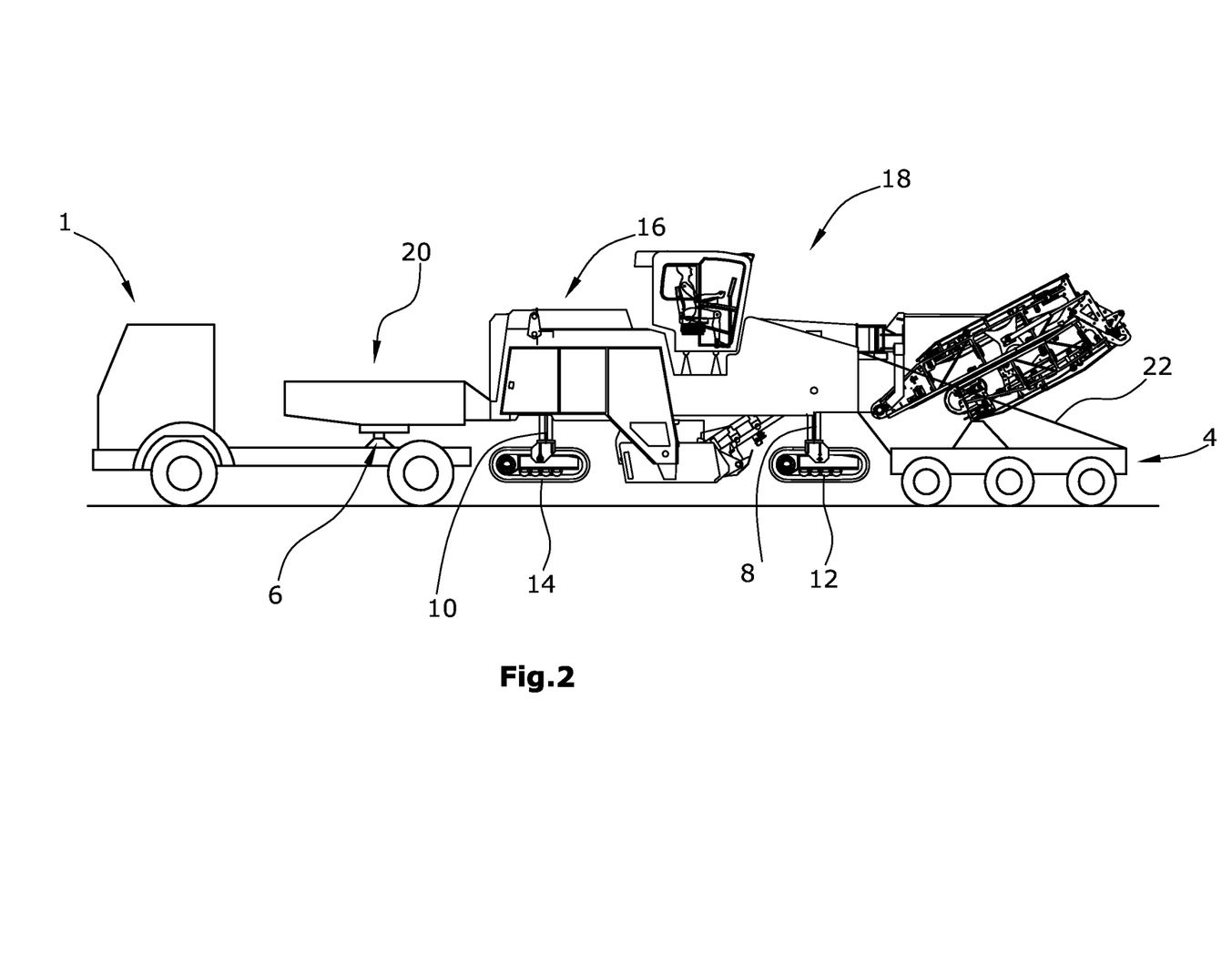
FIG. 2 shows an alternative embodiment of the transport system according to FIG. 1

The embodiment according to FIG. 2 is different in that the front end of the machine frame 16 of the large milling machine 18 as seen in the direction of travel of the transport system represents the rear side of the large milling machine 18, that is, the rear side as seen in the direction of operation of the large milling machine 18. The rear end of the machine frame 16 as seen in the direction of travel of the transport system represents the front side of the large milling machine 18, that is, the front side as seen in the direction of operation of the large milling machine 18. Furthermore, in the embodiment according to FIG. 2, the front end of the machine frame 16 of the large milling machine 18 as seen in the direction of travel of the transport system is supported on the fifth-wheel coupling 6 with a first coupling device 20 attached to the machine frame 16. The rear end of the machine frame 16 as seen in the direction of travel of the transport system is supported on the trailer 4 via a second coupling device 22.

Figure 3:
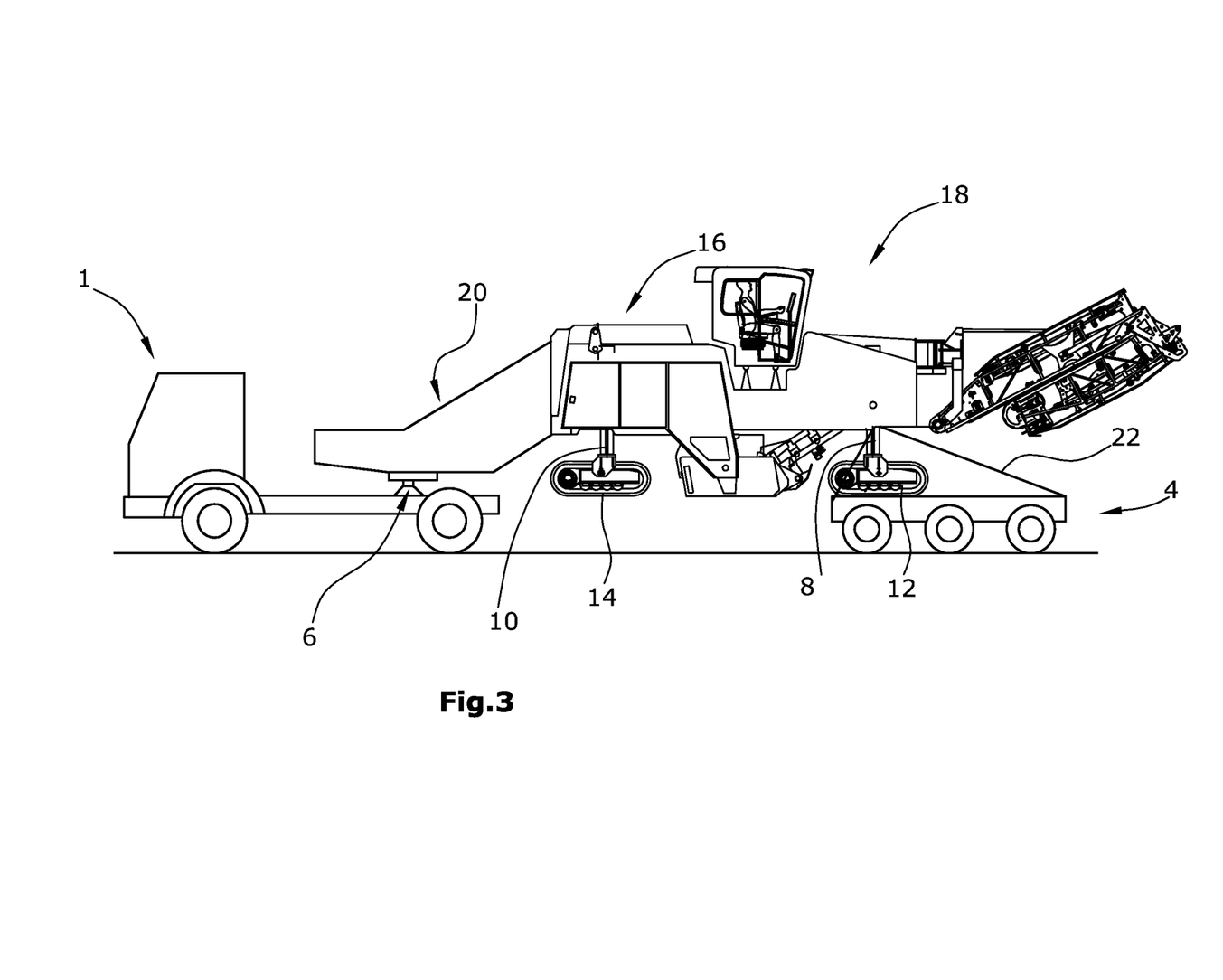
FIG. 3 shows further alternative embodiment of the transport system according to FIGS. 1 and 2.

The embodiment according to FIG. 3 is different from the embodiment according to FIG. 2 in that the rear end of the machine frame 16 as seen in the direction of travel of the transport system is supported on the trailer 4 via a second coupling device 22 connected with the machine frame 16 as well as via the ground-engaging units 12.

The embodiment according to FIGS. 4a to 4i depicts individual method steps of the method for transporting a large milling machine self-propelled by ground-engaging units. In FIGS. 4a to 4e, the large milling machine 18, the trailer 4 and the tractor unit 1 are depicted only schematically and in very simplified form.

Figure 4A:
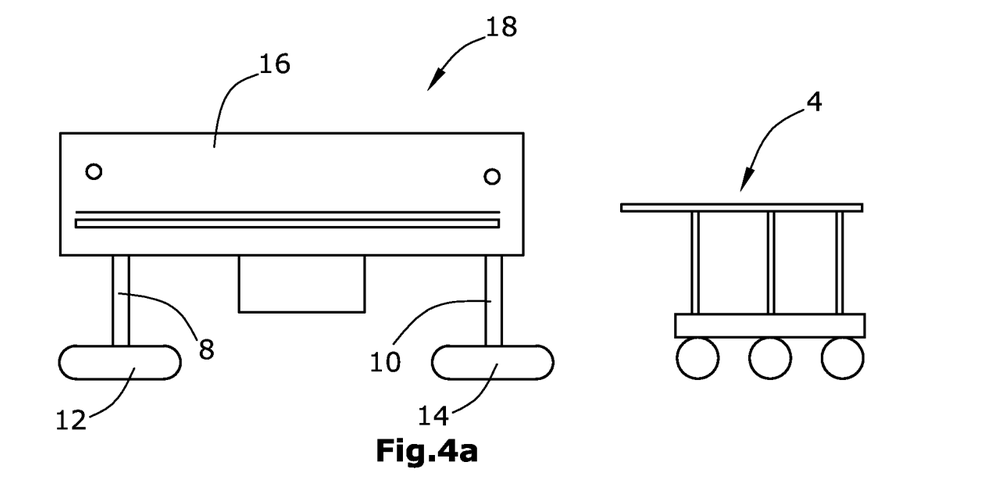
FIG. 4a-4i shows method steps of the method for transporting a large milling machine self-propelled by ground-engaging units.
Figure 4B:
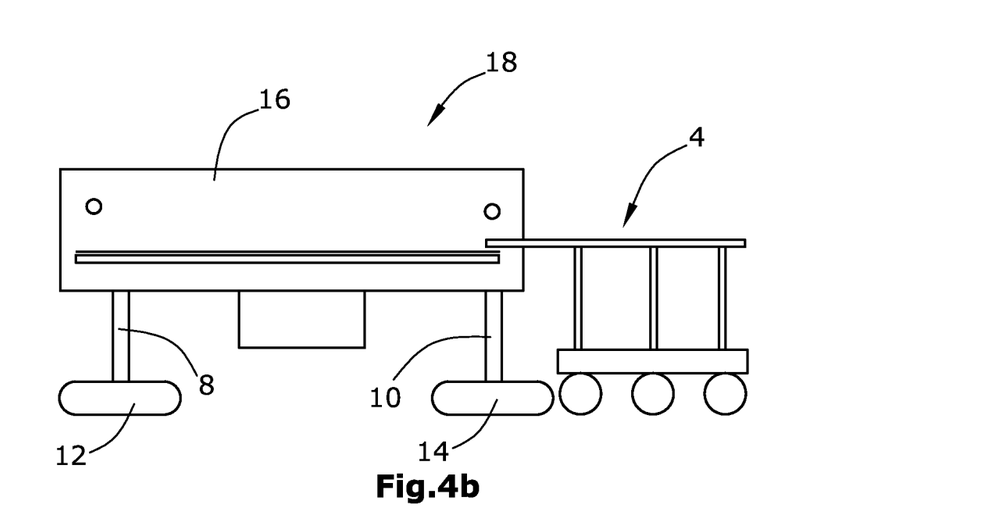

It is depicted in FIGS. 4a and 4b that, for coupling the large milling machine 18 to the fifth-wheel coupling 6 of the tractor unit 1 and to the multiple-axle trailer 4, the machine frame 16 of the large milling machine 18 is positioned using the ground-engaging units 12, 14 and the lifting devices 8, 10 of the large milling machine 18.

Figure 4C:
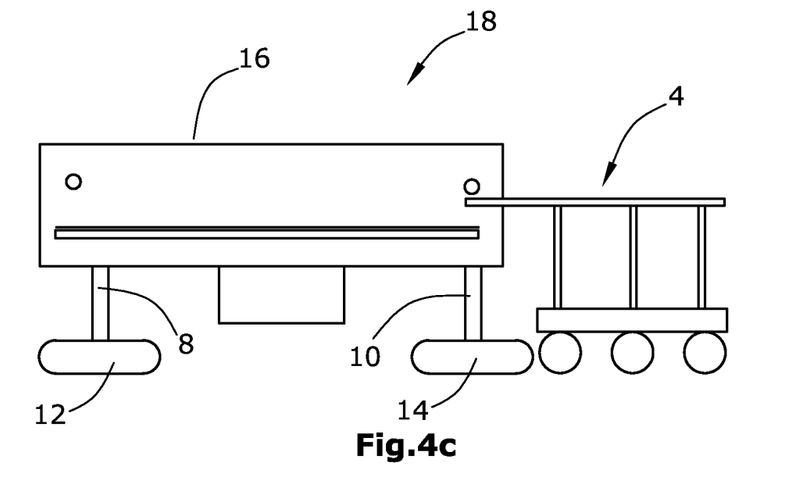
Figure 4D:
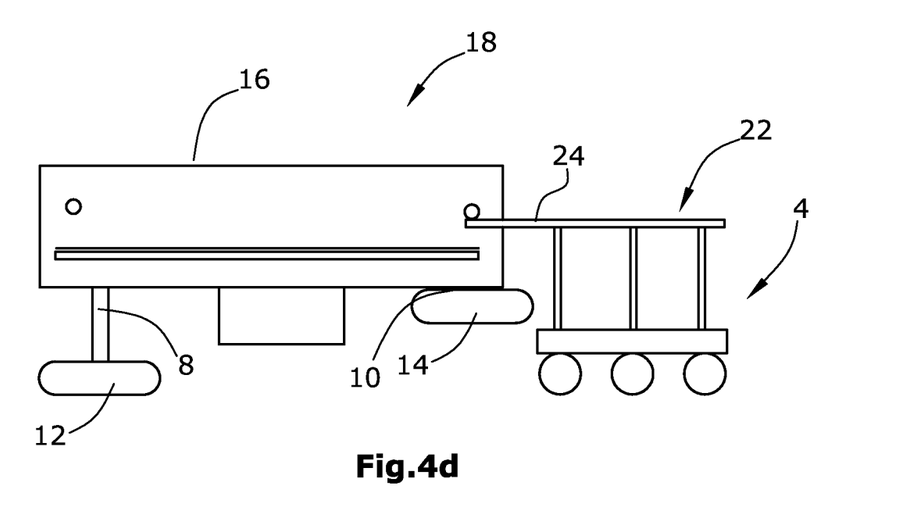
Figure 4E:
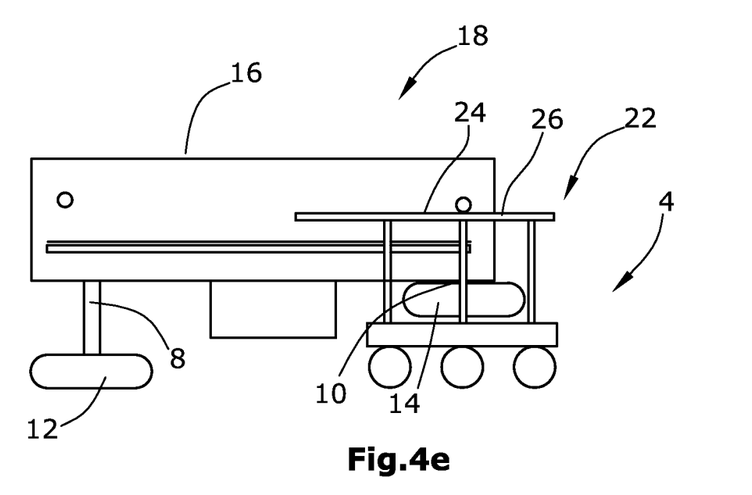
Figure 4F:
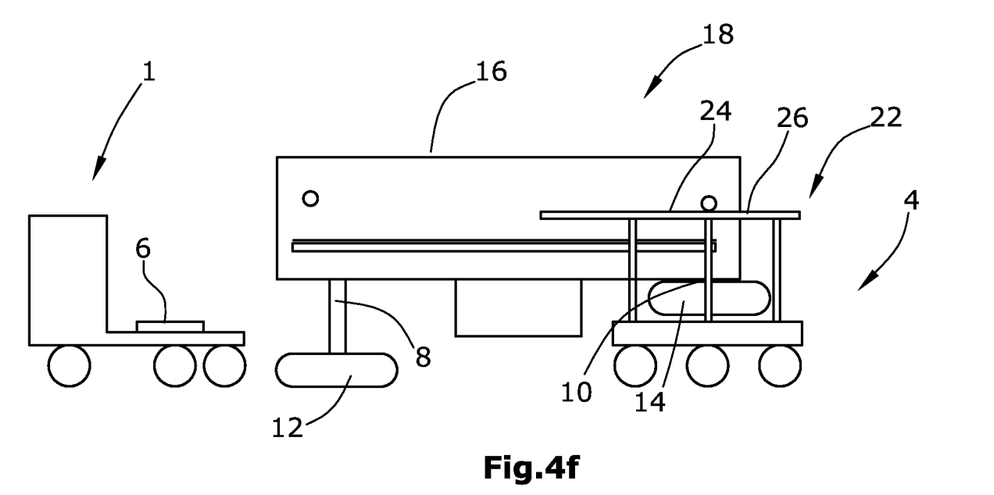

Coupling and supporting the machine frame 16 on the multiple-axle trailer 4 is depicted in FIGS. 4c to 4e. For this purpose, as depicted in FIG. 4b, the large milling machine 18 is preferably initially positioned relative to the multiple-axle trailer 4 using the ground-engaging units 12, 14 and/or the lifting devices 8, 10 of the large milling machine 18. Then, as depicted in FIG. 4c, the machine frame 16 of the large milling machine 18 is coupled to the multiple-axle trailer 4. Subsequently, the machine frame 16 is supported on the trailer 4. For supporting on the trailer 4, the ground-engaging units 14 are retracted by means of the lifting device 10.

It is depicted in FIG. 4e that the ground-engaging units 14 of the large milling machine 18 can be placed above or on the trailer 4 using the driving device of the large milling machine 18 and/or using the driving device of the tractor unit 1. It is also depicted in FIG. 4e that the machine frame 16 is preferably locked on the trailer 4, and thus a rigid connection is established between the machine frame 16 and the trailer 4.

The trailer 4 comprises a coupling device 22 via which, as a minimum, a part of the machine frame 16 of the large milling machine 18 is supported on the trailer 4. The coupling device 22 is preferably a frame structure. A shifting device 24 may be arranged by way of which, after coupling and supporting on the frame structure of the coupling device 22, the part of the machine frame 16 already coupled to the coupling device 22 can be shifted. The shifting device 24 may, for example, comprise rollers. By means of the ground-engaging unit 12 still located on the ground and the driving device of the large milling machine 18, the large milling machine 18 can be shifted in relation to the trailer 4 by means of the shifting device 24 so that the ground-engaging units 14 can be placed on the trailer 4, preferably centrally on the trailer 4. This is depicted in FIG. 4e. In this position, the coupling device 22 may furthermore comprise a locking device 26 by means of which the machine frame 16 can be fixed or locked, respectively, in the specified position on the coupling device 22.

Repeating the steps a) and b) to establish a mechanical connection between the tractor unit and the trailer via, as a minimum, the machine frame is depicted in FIGS. 4f-4i. In this arrangement, the large milling machine is positioned relative to the tractor unit, and the machine frame 16 is coupled to the fifth-wheel coupling 6 of the tractor unit 1.

Figure 4G:
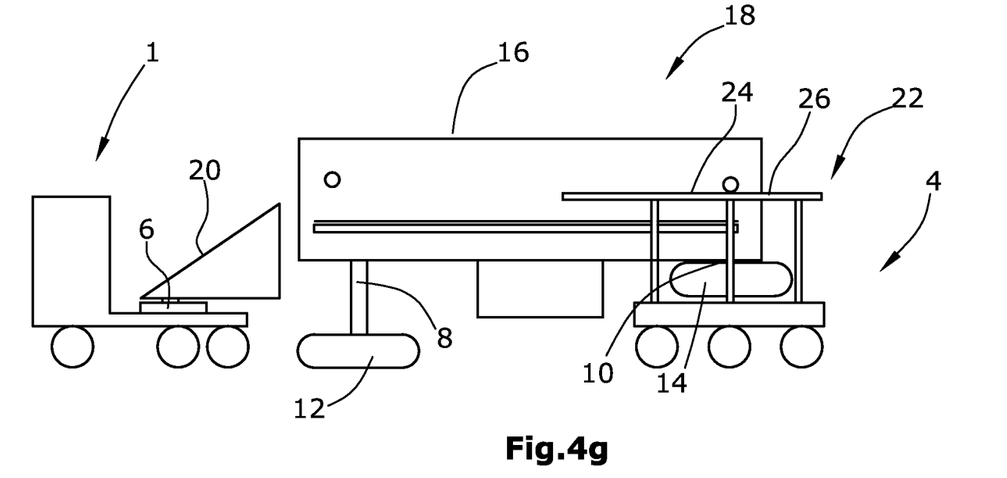

For this purpose, as is depicted in FIG. 4g, a coupling device 20 may preferably be attached at the fifth-wheel coupling.

Figure 4H:
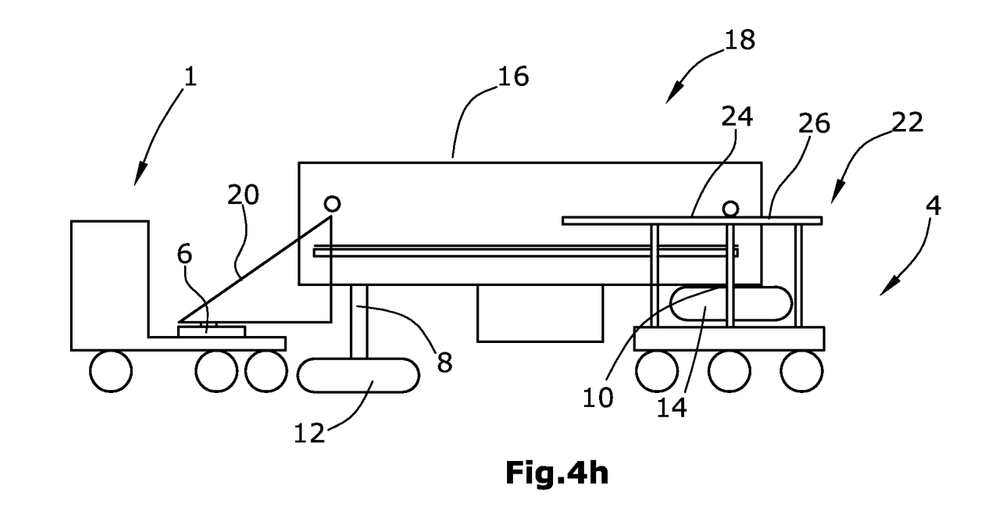

It is depicted in FIG. 4h that the large milling machine 18 is positioned relative to the tractor unit 1 preferably using the ground-engaging units 12 and/or the lifting device 8 of the large milling machine 18. In the process, the trailer 4 is also moved by the large milling machine 18. The large milling machine 18 may also be positioned relative to the tractor unit by means of the tractor unit 1.

By lowering the machine frame by means of the lifting devices 8 in FIG. 4h, positioning can be effected in such a fashion that the machine frame 16 of the large milling machine 18 can be coupled to the fifth-wheel coupling 6 of the tractor unit 1. In the process, coupling of the machine frame 16 of the large milling machine 18 is preferably effected via the coupling device 20.

Figure 4I:
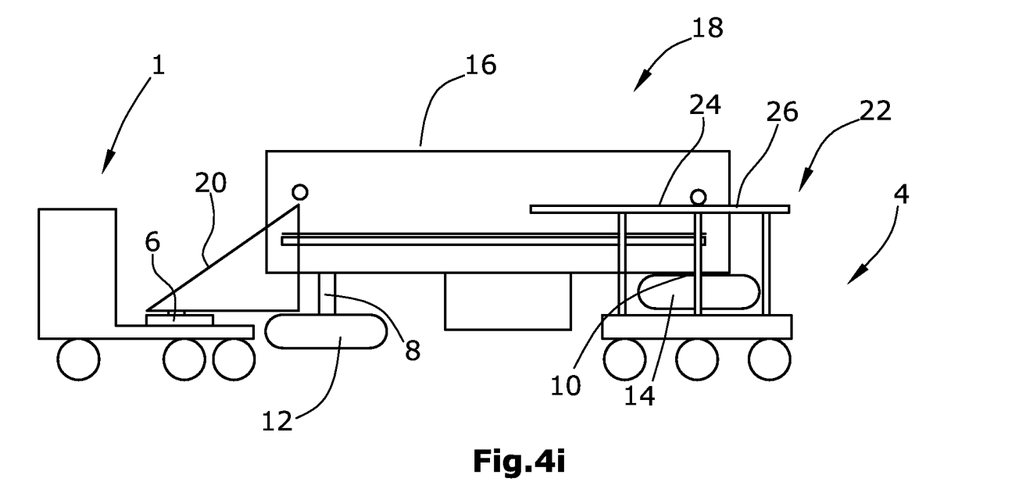

As is depicted in FIG. 4i, it is achieved by a further retraction of the ground-engaging units by means of the lifting devices 8 that the machine frame 16 or, as a minimum, a part of the machine frame 16 is subsequently supported on the tractor unit 1 via the coupling device 20.

It can be clearly inferred from FIG. 4*i* that the trailer 4 is coupled to the tractor unit 1 mechanically via the machine frame 16. The machine frame 16 of the large milling machine 18, as a minimum, can be used with the trailer 4 as semi-trailer. In the embodiment depicted, the first and the second coupling devices 20, 22 are also part of the semi-trailer. In the transport position depicted, the large milling machine 18 has a specified ground clearance and is suspended.

It is understood that, for coupling and supporting the machine frame 16 on the fifth-wheel coupling 6 of the tractor unit 1 and on the trailer 4, the large milling machine 18 may initially also be positioned relative to the tractor unit 1 preferably using the ground-engaging units 12, 14 and/or the lifting devices 8, 10 of the large milling machine 18, and the machine frame 16 of the large milling machine 18 may be coupled to the fifth-wheel coupling 6 of the tractor unit 1, and that the large milling machine 18 may subsequently be positioned relative to the trailer 4, and the machine frame 16 of the large milling machine 18 may be coupled to the trailer 4.

Figure 5:
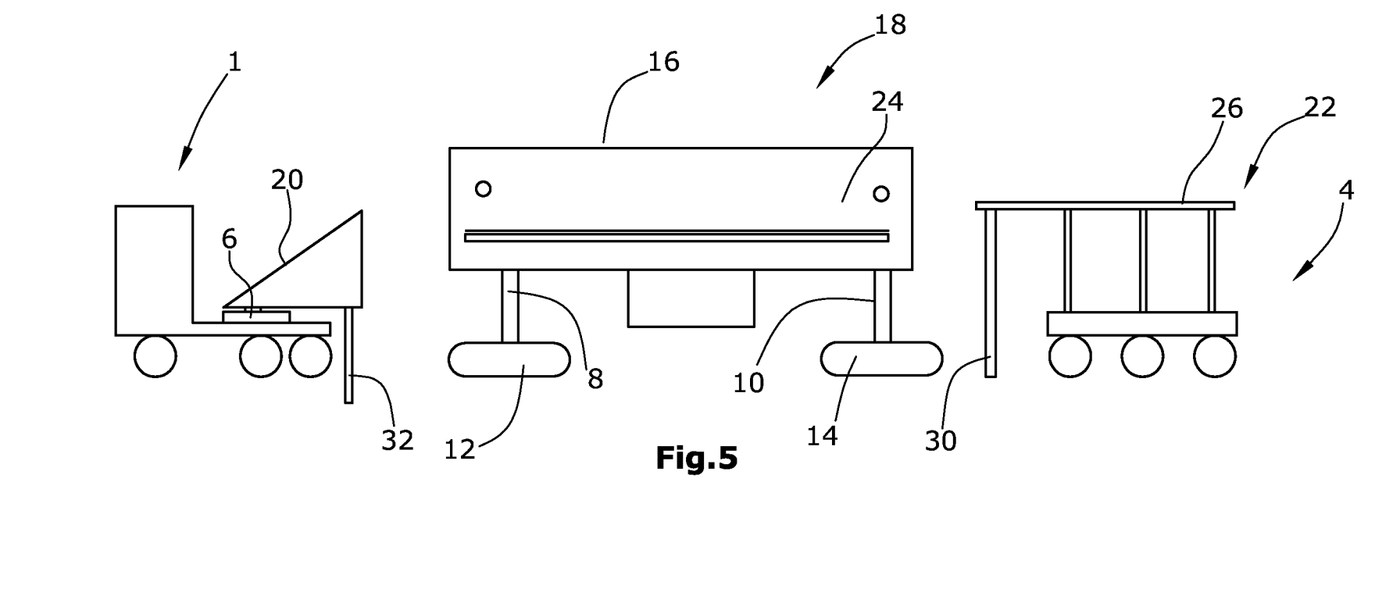
FIG. 5 shows representation of the transport system for a self-propelled large milling machine.

An embodiment is depicted in FIG. 5 from which it can be inferred that the coupling device 22 of the trailer and/or the coupling device 20 of the tractor unit 1 may each comprise a supporting device 30, 32. Such supporting device can be brought into contact with the ground prior to coupling and supporting on the trailer 4 and/or the tractor unit 1 and serve as an additional supporting device during coupling and supporting. The supporting devices 30, 32 can then be retracted again after successful supporting on the trailer 4 and/or the tractor unit 1.

The invention claimed is:

1. A method of transporting a milling machine using a tractor unit including a fifth-wheel coupling configured to be coupled to a semi-trailer behind the tractor unit, the milling machine including a machine frame, a plurality of ground-engaging units for propelling the milling machine, and a plurality of lifting columns extending between the machine frame and the plurality of ground-engaging units for adjusting a height of the machine frame above a ground surface, wherein the method comprises:
   (a) positioning the machine frame of the milling machine relative to one of the fifth-wheel coupling and a support trailer by using one or more of the lifting columns to raise the machine frame relative to the ground-engaging units, and by using one or more of the ground-engaging units of the milling machine to move the machine frame of the milling machine across the ground surface while the machine frame is raised relative to the ground engaging units;
   (b) coupling the machine frame to and supporting the machine frame on the one of the fifth-wheel coupling and the support trailer;
   (c)(1) positioning the machine frame of the milling machine relative to the other of the fifth-wheel coupling and the support trailer; and
   (c)(2) coupling the machine frame to and supporting the machine frame on the other of the fifth-wheel coupling and the support trailer, such that at least the machine frame and the support trailer form a semi-trailer coupled to the fifth-wheel coupling.

2. The method of claim 1, wherein:
   step (a) includes initially positioning the machine frame relative to the tractor unit; and
   then step (b) includes coupling the machine frame to and supporting the machine frame on the fifth-wheel coupling of the tractor unit; and
   then step (c)(1) includes positioning the machine frame relative to the support trailer; and
   then step (c)(2) includes coupling the machine frame to and supporting the machine frame on the support trailer.

3. The method of claim 1, wherein:
   step (a) includes initially positioning the machine frame relative to the support trailer; and
   then step (b) includes coupling the machine frame to and supporting the machine frame on the support trailer; and
   then step (c)(1) includes positioning the machine frame relative to the tractor unit; and
   then step (c)(2) includes coupling the machine frame to and supporting the machine frame on the fifth-wheel coupling of the tractor unit.

4. The method of claim 1, further comprising:
   retracting the lifting columns such that the milling machine is supported by the tractor unit and the support trailer with a ground clearance between the milling machine and the ground surface.

5. The method of claim 1, further comprising:
   placing at least one of the ground-engaging units above or on the support trailer by propelling the milling machine with one or more of the ground-engaging units or by propelling the tractor unit with a drive of the tractor unit.

6. The method of claim 1, wherein:
   a front coupling structure is attached to a front end of the machine frame as seen in a direction of travel, and the front coupling structure is coupled to the fifth-wheel coupling such that at least the front coupling structure, the machine frame and the support trailer form the semi-trailer.

7. The method of claim 1, wherein:
   a rear coupling structure is attached to a rear end of the machine frame as seen in a direction of travel, and the rear coupling structure is coupled to the support trailer such that at least the rear coupling structure, the machine frame and the support trailer form the semi-trailer.

8. The method of claim 1, further comprising steering the support trailer.

9. The method of claim 1, wherein:
   step (c)(1) includes positioning the machine frame of the milling machine relative to the other of the fifth-wheel coupling and the support trailer using a drive of the tractor unit.

* * * * *